(12) United States Patent
Lehtovaara et al.

(10) Patent No.: US 7,507,172 B2
(45) Date of Patent: Mar. 24, 2009

(54) TIMING BELT TENSIONER WITH STOPS CONTROLLED BY FRICTIONAL BRAKE

(75) Inventors: Jorma J. Lehtovaara, Etobicoke (CA); Jacek Stepniak, Innisfil (CA); Marek Frankowski, Stroud (CA); Mats K. Lipowski, Toronto (CA); Richard A. Forrest, Cookstown (CA)

(73) Assignee: Litens Automotive, Woodbridge, Ontario (CA)

( * ) Notice: Subject to any disclaimer, the term of this patent is extended or adjusted under 35 U.S.C. 154(b) by 624 days.

(21) Appl. No.: 10/497,958

(22) PCT Filed: Dec. 3, 2002

(86) PCT No.: PCT/CA02/01854

§ 371 (c)(1),
(2), (4) Date: Jun. 7, 2004

(87) PCT Pub. No.: WO03/048606

PCT Pub. Date: Jun. 12, 2003

(65) Prior Publication Data

US 2006/0035740 A1    Feb. 16, 2006

(51) Int. Cl.
*F16H 7/08*    (2006.01)
(52) U.S. Cl. ............................... 474/109
(58) Field of Classification Search ............ 474/101, 474/109, 113, 117, 118, 119, 121, 122, 139, 474/133, 135
See application file for complete search history.

(56) References Cited

U.S. PATENT DOCUMENTS

| | | | |
|---|---|---|---|
| 4,583,962 A | | 4/1986 | Bytzek et al. |
| 4,784,631 A | * | 11/1988 | Henderson ............ 474/135 |
| 4,822,322 A | * | 4/1989 | Martin ............ 474/135 |
| 4,917,655 A | | 4/1990 | Martin |
| 4,923,435 A | | 5/1990 | Kadota et al. |
| 5,057,059 A | * | 10/1991 | Sidwell et al. ............ 474/135 |
| 5,129,864 A | * | 7/1992 | Quintus et al. ............ 474/135 |

(Continued)

FOREIGN PATENT DOCUMENTS

DE      3718227      6/1987

(Continued)

OTHER PUBLICATIONS

English Abstract of DE 3718227 Published Jun. 1, 1987.

(Continued)

*Primary Examiner*—Vicky A Johnson
(74) *Attorney, Agent, or Firm*—Clark Hill PLC

(57) ABSTRACT

A tensioner (10) features a backstop device (40) which allows free rotation of the pivot arm (20) in one direction but not the other. Reverse rotation is prevented by friction that is able to resist torque on the pivot arm (20) under ordinary operating conditions which otherwise could permit belt tooth-skip to occur. In disclosed embodiments, the backstop device (40) includes a stop sleeve (50) and a clamp holder (60) which are axially interlocked and are able to rotate relative to each other. A clutch spring (80) surrounds permits relative rotation between the stop sleeve (50) and the clamp holder (60) in one direction but not the other. A clamp (70) retained within the clamp holder (60) frictionally engages the pivot shaft. A viscous coupling may be used in place of the frictional clamp.

13 Claims, 11 Drawing Sheets

U.S. PATENT DOCUMENTS

| | | | | |
|---|---|---|---|---|
| 5,149,306 A | * | 9/1992 | Sidwell et al. | 474/135 |
| 5,647,813 A | * | 7/1997 | Serkh | 474/135 |
| 6,231,465 B1 | * | 5/2001 | Quintus | 474/133 |
| 6,592,482 B2 | * | 7/2003 | Serkh | 474/135 |
| 6,609,988 B1 | * | 8/2003 | Liu et al. | 474/133 |
| 6,863,631 B2 | * | 3/2005 | Meckstroth et al. | 474/135 |
| 7,004,863 B2 | * | 2/2006 | Serkh et al. | 474/109 |
| 7,229,374 B2 | * | 6/2007 | Meckstroth et al. | 474/133 |
| 2003/0078124 A1 | * | 4/2003 | Serkh | 474/135 |
| 2004/0185976 A1 | * | 9/2004 | Meckstroth et al. | 474/101 |
| 2006/0035740 A1 | * | 2/2006 | Lehtovaara et al. | 474/237 |

FOREIGN PATENT DOCUMENTS

| | | |
|---|---|---|
| DE | 19813586 | 9/1999 |
| EP | 0 517 185 A2 | 12/1992 |
| EP | 0 678 685 A1 | 10/1995 |
| EP | 0 967 412 A2 | 12/1999 |

OTHER PUBLICATIONS

English Abstract of DE 19813586 Published Sep. 30, 1999.

* cited by examiner

TIMING BELT TENSIONER WITH STOPS CONTROLLED BY FRICTIONAL BRAKE

FIELD OF THE INVENTION

The invention relates in general to automotive belt tensioners and, in particular, to a timing belt tensioner in which the position of the arm backstop is controlled by a one-way clutch and a frictional brake.

BACKGROUND OF THE INVENTION

Automotive belt tensioners are well known in the art and have been used to regulate tension in various belt systems, e.g., timing belts. In general, a belt tensioner includes a movable support structure that rotatably supports a portion of a belt in an engine or other mechanical system. The rotational position of the arm/pulley sub-assembly of a belt tensioner normally self-adjusts to compensate for increases or decreases in belt path length due to the thermal expansion or contraction of the engine and/or belt wear and stretch, thereby regulating tension in the belt. Additionally, the entire tensioner assembly is normally manually adjustable relative to the engine block so that the tensioner can be adjusted to the proper position on the engine regardless of the engine build tolerances.

One common type of conventional belt tensioner includes a fixed structure and a pivoted structure, which generally consists of an arm/pulley sub-assembly that is pivotally mounted on the fixed structure. A coil spring surrounds the pivoted member, and the ends of the spring are respectively connected to the fixed structure and the pivoted structure so as to bias the pivoted structure toward a position of maximum belt take-up. The spring biasing force decreases as the pivoted structure moves from a position of minimum belt take-up to a position of maximum belt take-up. Although the spring force varies within the range of movement provided, substantially constant tension is maintained on the belt. U.S. Pat. No. 4,473,362 discloses such a tensioner.

Additionally, timing belt and chain tensioners normally have stroke limiters. A stroke limiter customarily includes a pair of fixed stops which prevent rotation of the pivot arm beyond predetermined distances from the normal pivot arm position; a first stop limits arm rotation towards the belt and is commonly referred to as a "free arm stop," and a second stop limits arm rotation away from the belt and is commonly referred to as a "backstop." The backstop is normally positioned such that even if the pivot arm is rotated against it, there will not be enough slack in the belt for the belt to rise above the teeth in any of the sprockets in the drive and "jump over" or disengage from the teeth. In other words, the backstop is designed to prevent tooth skip, which tooth skip would otherwise cause timing errors between the various sprockets and, consequently, equipment errors and damage.

The common practice of placing the backstop at a certain distance from the nominal pivot arm position is not feasible for tensioners which provide no initial manual installation adjustment and with which the rotation of the pivoted structure is intended to compensate for engine build tolerances. In other words, with such tensioner configurations, the tensioner arm does not have any fixed nominal position and, therefore, there is no fixed backstop position, either, thus making it necessary to adjust the backstop position during the initial tensioner installation either manually or, preferably, automatically. In addition, the increased life expectancy of modern engine components results in longer belt life and belt stretch, and hence generally greater adjustment ranges are required for the pivoted structure of the tensioner during the life of the tensioner. Therefore, if manual service adjustments are to be avoided, it becomes even more important for the backstop position to be self-adjusting.

Several known tensioner designs provide such self-adjustment of the tensioner backstop. For example, U.S. Pat. No. 4,145,934 discloses a wedge which is pushed against the arm eccentric (lever) so that the arm cannot rotate away from the belt once the tensioner arm has been biased towards the belt by the tensioning spring. Similarly, U.S. Pat. No. 4,351,636 discloses a tensioner that is similar in principle, but with a ratchet-and-pawl assembly instead of a wedge. Another ratchet-and-pawl type tensioner mechanism is disclosed in U.S. Pat. No. 4,634,407. In each of these patents, however, the tensioner arm is unable to rotate away from the belt once it has rotated towards the belt; thus, such configurations do not allow for belt tension control during thermal expansion of the engine block.

U.S. Pat. No. 4,583,962 discloses an improvement over such designs. In particular, it discloses a mechanism which allows a limited amount of return stroke of the arm towards the backstop to accommodate thermal expansion of the engine. The tensioner of this patent utilizes a spring clutch-type one-way device and an arc-shaped slot configured to permit the arm to rotate backwards. Similarly, U.S. Pat. Nos. 4,822,322 and 4,834,694 disclose tensioners in which the one-way mechanisms are constituted by conventional, one-way (roller) clutches, and tensioner arm return stroke is controlled by arc-shaped slots. Furthermore, U.S. Pat. No. 4,808,148 discloses a tensioner in which, rather than a slot-limited reverse stroke, a resilient biasing element (e.g., an elastomeric spring) is provided between the ratchet-and-pawl assembly and the stationary mounting member.

The above-mentioned tensioner designs all suffer from the limitation that the backstop can not move back, away from the belt, once it has moved towards the free arm position or when operating under other than optimum, hot engine running conditions. Because the backstop may move beyond the optimum position during cold starts and/or as a result of severe engine kick-backs, the tensioner arm will frequently contact the backstop, thereby causing noise, damage, and/or premature failure of the components. Furthermore, tensioners of this type do not permit the belt to be re-installed or replaced.

U.S. Pat. No. 4,923,435 discloses a tensioner with viscous material disposed between the arm and a one-way clutch mechanism. This particular design does not, however, guarantee that the tensioned belt will not jump a tooth. Because the viscous material allows the tensioner arm to rotate if the belt load is applied continuously (which can occur particularly when the engine is forced to rotate backwards due to the car rolling backward without the engine running), the viscous material does not function as a positive stop, but rather only as a rotational damper.

SUMMARY OF THE INVENTION

The present invention overcomes these limitations of the prior art by providing a tensioner in which the backstop automatically "finds" its proper operational position by "following" the tensioner arm as it pivots toward the free arm position; which maintains that operational backstop position under nominal or transitory (e.g., vibratory) belt loads; and which permits the backstop to be moved backwards manually (e.g., during installation) and to move backwards under sufficiently or prolonged high belt loads.

According to one aspect of the invention, a timing belt tensioner has a pivot shaft which is secured to the engine block; a pivot arm pivotally mounted on the pivot shaft; a torsion spring operatively mounted between the pivot arm and a fixed structure (e.g., the engine block) so as to bias the pivot arm in a belt take-up direction (i.e., toward a free arm position); and a backstop device. The backstop device includes a generally cylindrical stop sleeve, a frictional brake (supported, e.g., by a generally cylindrical clamp holder), and a one-way clutch. The stop sleeve and the pivot arm preferably are cooperatively configured to permit a predetermined, limited amount of rotational movement of the pivot arm relative to the stop sleeve. The one-way clutch allows relatively free rotational movement of the stop sleeve (and hence the pivot arm) towards the free arm position, but engages the stop sleeve to the frictional brake when the stop sleeve rotates away from the belt, i.e., towards the minimum belt take-up position, with the frictional brake effectively "anchoring" the one-way clutch to a fixed anchoring point, e.g., to the pivot shaft or directly to the engine block. Alternatively, a hydraulic coupling, e.g., one using a viscous material, may be implemented in place of the frictional brake.

The frictional brake resists arm movement towards the minimum belt take-up position caused by belt forces at a level such as that resulting from the crankshaft being turned backwards, but "releases" and allows the backstop to rotate toward the minimum belt take-up position when the pivot arm is rotated manually, e.g., during installation. The configuration of the tensioner according to the invention permits easy installation, simplifies construction, and hence reduces manufacturing and installation time and cost.

According to another aspect of the invention, rotary apparatus for selectively transmitting rotary power or torque includes a pair of rotary members which are axially interconnected directly with each other and which are rotatable relative to each. A one-way clutch spring is disposed in overlying relation with the pair of rotary members and rotationally interlocks (i.e., prevents relative rotation between) the pair of rotary members when one of the rotary members rotates in one direction and allows the rotary members to rotate relative to each other when it rotates in the opposite direction. One of the rotary members may have a lip which constrains opening of the turns of the clutch spring, and the clutch spring may have one or more turns of a larger diameter than the rest of the turns to provide a certain amount of free stroke before the clutch spring rotationally interlocks the rotational members.

BRIEF DESCRIPTION OF THE DRAWINGS

The invention will now be described in greater detail in connection with the drawings, in which.

DETAILED DESCRIPTION OF THE INVENTION

Figure 1:
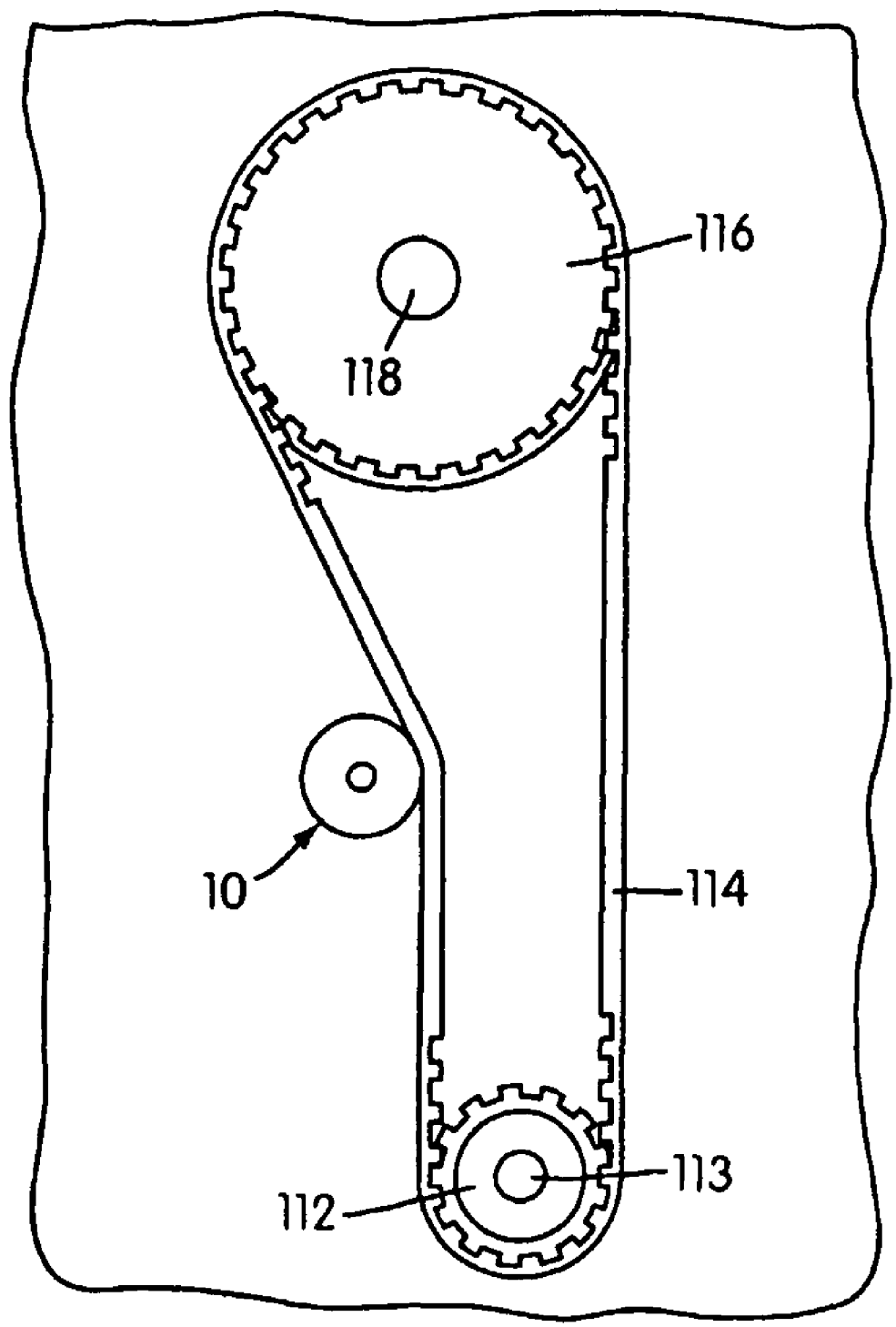
FIG. 1 is a partial front elevation view illustrating an automobile internal combustion engine with a timing belt assembly including a tensioner.

A timing belt system for an internal combustion engine is illustrated in FIG. 1. A toothed, pulley sprocket 112 is fixed to the crankshaft 113 of the engine, and an internally toothed belt 114 is driven by the sprocket 112. The toothed belt 114 is trained about (and hence drives) a second, externally toothed sprocket 116, which sprocket 116 is fixed to (and hence causes to rotate) a cam shaft 118 of the engine. A tensioner 10 according to the invention is mounted in tensioning relation with the belt 114.

Figure 2:
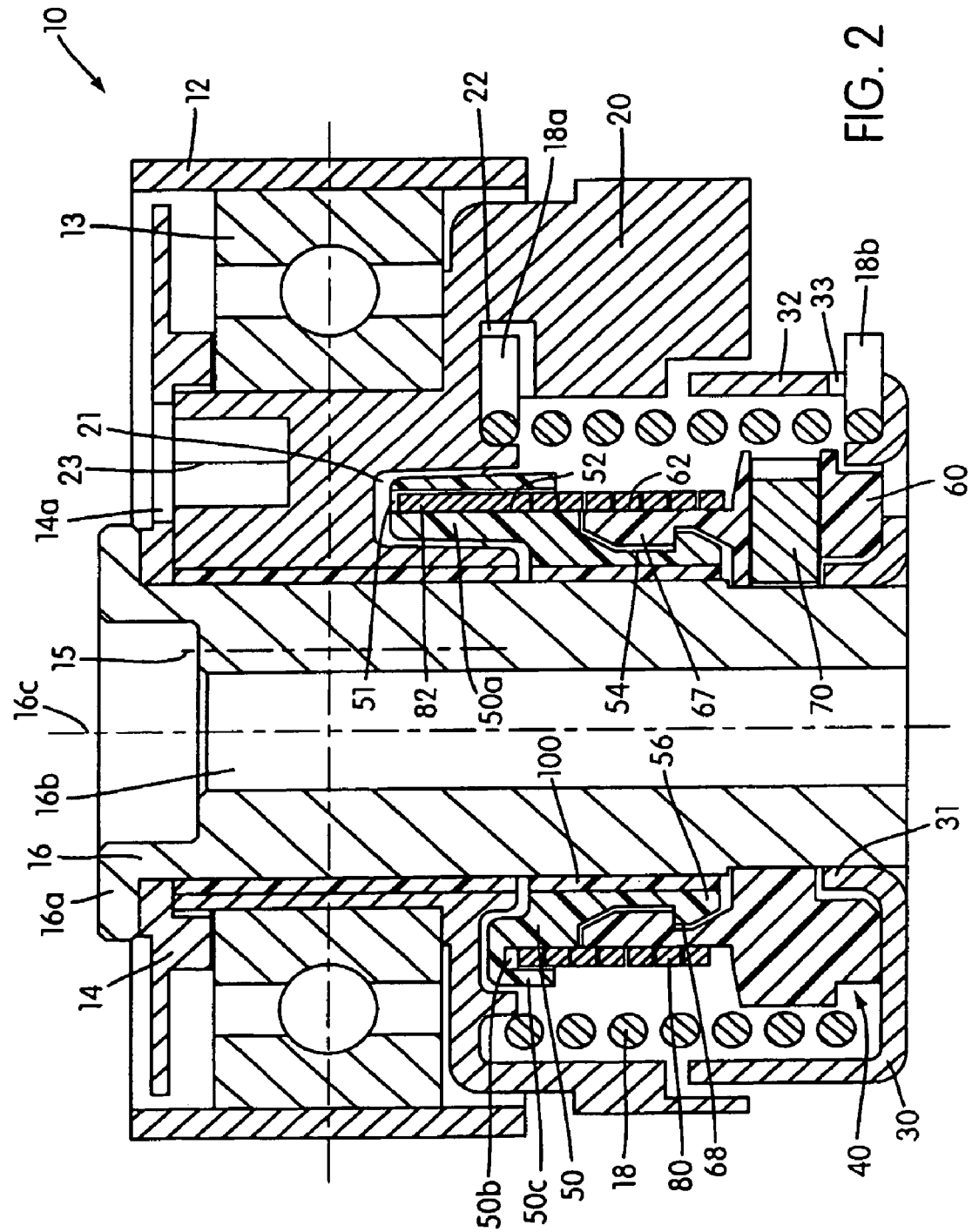
FIG. 2 is a section view of one embodiment of a tensioner according to the invention.

As illustrated in FIG. 2, the tensioner 10 generally consists of a pulley 12 that is mounted on a ball bearing assembly 13 which extends circumferentially around a pivot arm 20, and the pivot arm 20 is eccentrically pivotally mounted on a pivot shaft 16, e.g., by means of a journal. In other words, the pulley 12 rotates around its own axis of rotation 15 extending through the center of the ball bearing assembly 13, and the pivot arm 20 pivots (with the pulley 12 pivoting with it) around the longitudinal axis 16c of the pivot shaft 16, which is generally spaced from and parallel to the axis of rotation 15 of the pulley 12.

The pivot shaft 16 has a bore 16b extending longitudinally through the center of it, and an installation bolt (not shown) passing through the bore secures the tensioner assembly to the engine. The pivot shaft 16 is attached via a press fit to a base plate 30 which, in its preferred configuration, has a center extrusion 31 to improve the press fit between the base plate and the pivot shaft.

A torsional coil spring 18 surrounds the lower portion (as illustrated) of the tensioner and is operatively mounted between the arm 20 and the base plate 30, with one spring tang 18a extending into a corresponding slot 22 in the arm 20 and the other spring tang 18b extending into a slot 33 formed in the upwardly extending outer skirt 32 of the base plate 30. During assembly of the tensioner 10, the arm 20 is rotated relative to the base plate 30 before the arm 20 is brought into its final axial position, thereby preloading the spring 18 so as to bias the arm 20 rotationally towards the free arm position. A thrust washer 14 is located between the body of the arm 20 and the flange 16a of the pivot shaft 16 and reduces friction between these parts when the arm 20 rotates.

Figure 4:
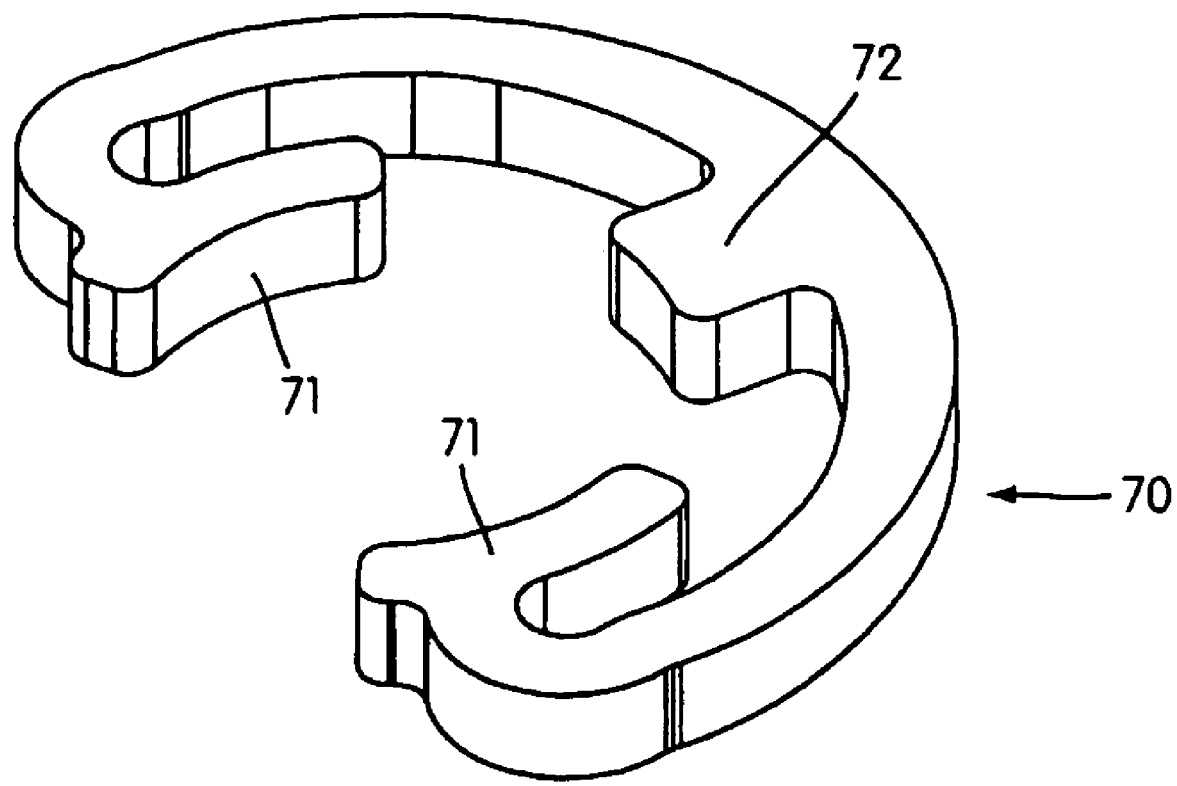
FIG. 4 is a perspective view illustrating the brake clamp shown in FIG. 2.

A backstop device 40 is installed about the pivot shaft 16, between the arm 20 and the base plate 30. In one embodiment, the backstop device 40 consists of a generally cylindrical stop sleeve 50; a directly interconnected, generally cylindrical clamp holder 60; a frictional brake member in the form of a clamp 70; a clutch spring 80; and a bushing 100. The frictional clamp 70, which is illustrated in greater detail in FIG. 4, is held within the clamp holder 60 in frictionally rotational engagement with the pivot shaft 16, and the clamp holder 60 and frictional clamp 70 are cooperatively configured so as to rotate relative to the pivot shaft 16 together, i.e., as a single unit.

In one preferred form, the clamp holder 60 is directly interconnected with the stop sleeve 50 by means of external, flange-type protrusions 56 and circumferentially extending external groove section 54 on the stop sleeve 50, which protrusions and groove mate with an internal groove 68 and an internal ring 67, respectively, on the clamp holder 60. The end of the stop sleeve 50 on which the protrusions 56 and the groove 54 are located is divided into several narrow, flexible, finger-like portions 59 by means of axial slits 53, as shown in 3. Because the finger-like portions 59 are radially flexible, the protrusions 56 will be forced inwardly so as to pass through the internal ring 67 of the clamp holder 60 when the two parts are assembled together and then will spring back to their original position. The interengagement of the protrusions, ring, and respective grooves will lock the stop sleeve 50 and clamp holder 60 axially together while at the same time permitting them to rotate with respect to each other. The stop sleeve 50 and the clamp holder 60 fit together with a clearance fit so as to permit relatively free rotational movement between these two components. The stop sleeve is made of a flexible material such as nylon to facilitate such inward flexing and outward spring-back.

The bushing 100 is inserted inside the stop sleeve 50 to prevent the protrusions 56 from collapsing inwards during the operational life of the tensioner. The bushing 100 will also increase the overall rigidity of the stop sleeve 50, especially when it is resisting the rotational arm movements.

The clamp 70 is designed to grip the pivot shaft 16, via pads or brake shoe-type elements 71, with a predetermined level of force to substantially or "selectively" secure the clamp 70, and hence the clamp holder 60, to the pivot shaft 16. The clamp 70 is designed to grip the pivot shaft 16 with sufficient force such that the level of torque required to overcome the frictional resistance force between the pad elements 71 and the pivot shaft 16 and cause the clamp 70 (and hence the clamp holder 60) to rotate, sliding frictionally relative to shaft pivot 16, is 1) higher than the level of torque caused by belt forces which result under conditions otherwise favorable to tooth slip, but 2) which will allow the clamp 70 (and hence the clamp holder 60) to rotate when subjected to torque loads which are higher than the designed holding torque of the clamp 70. Preferably, the clamp 70 is made of corrosion-resistant material with high yield strength such as 17-4 stainless steel, which permits a large degree of deflection of its spring element before reaching the required pre-load force. Alternatively, it is also possible to make the clamp out of high-strength carbon or tool steels and to apply a corrosion-resistant coating to the part.

Figure 3:
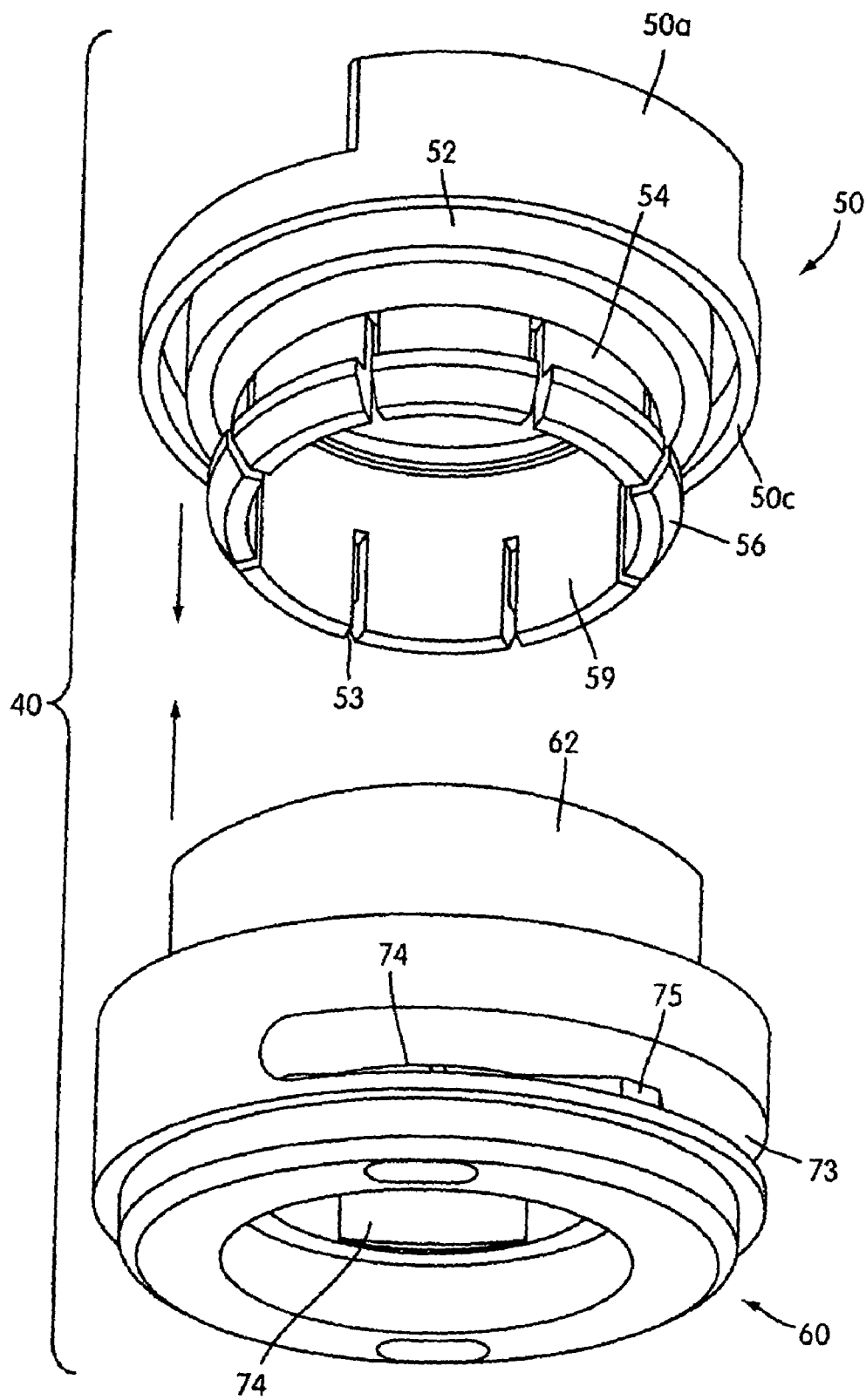
FIG. 3 is a perspective view illustrating the stop sleeve and clamp holder shown in FIG. 2.

In one preferred form, the clamp 70 will resemble the letter "C," with a pad or brake shoe-type element 71 attached to each of the ends, as shown in FIG. 4. When the clamp 70 is made in this form, it is preferable for the clamp 70 to have a tab 72 to help position the clamp and secure its engagement with the clamp holder 60. The frictional clamp 70 fits into groove 73 extending partially circumferentially around and partially radially into the clamp holder 60. The pads 71 fit through apertures 74 extending from the bottom of the groove 73 all the way through the wall of the clamp holder 60 (one aperture on either side of the clamp holder) and hence are able to grip the sides of the pivot shaft 16. Additionally, the tab 72 fits within a small slot (not visible) defined between ribs 75 (only one visible in FIG. 3) which are formed within the groove 73. The tab 72 thus helps position, and retain the position of, the frictional clamp 70 within the clamp holder.

Over at least a portion of the sections by which they are interconnected, the stop sleeve 50 and the clamp holder 60 have cylindrical exterior surfaces 52 and 62, respectively, which have the same diameter. The clutch spring 80 is mounted over the cylindrical surfaces 52 and 62 with a press fit. One end of the clutch spring 80 is formed into an axial tang 82 that is inserted into an axially extending hole 51 formed inside an axial tongue 50a extending from the stop sleeve 50, and the tang 82 causes the clutch spring 80 to rotate with the stop sleeve 50. The clutch spring 80 and the two cylindrical surfaces 52 and 62 perform a one-way clutch function: the clutch spring 80 will sliding rotate relative to the clamp holder 60, with almost no resistance, when the stop sleeve 50 rotates in one direction relative to the clamp holder 60 as the pulley 12 and pivot arm 20 rotate toward the belt 114, but the clutch spring 80 will constrict and lock all three parts (the stop sleeve 50, the clamp holder 60, and the clutch spring 80) together when the stop sleeve rotates in the opposite direction as the pulley 12 and pivot arm 20 rotate away from the belt 114. In particular, the coiling direction of the clutch spring 80 is selected such that the stop sleeve 50 (which rotates with the pivot arm 20, as addressed in more detail below) can rotate freely relative to the clamp holder 60 in the belt take-up direction (i.e., toward the free arm position), but the clutch spring 80 will constrict so as to clamp down rigidly on the cylindrical surfaces 52 and 62 when the stop sleeve 50 is rotated (by the arm 20) towards the minimum belt take-up position, thereby preventing the stop sleeve 50 from rotating relative to the clamp holder 60 in the minimum belt take-up direction.

The forces acting between the pivot arm 20 and the stop sleeve 50, as well as those acting between the stop sleeve 50 and the clamp holder 60, may tend to force the clamp holder 60 axially toward the base plate 30. Therefore, the bottom surface of the clamp holder 60 is preferably formed so as to provide a good thrust bearing surface.

The spring clutch may be configured and arranged in various ways, depending on the arrangement of the coil spring 80. It will be appreciated that the torque-transmitting capacity of the clutch spring depends on the number of coils engaged on each surface. Provided there is sufficient axial space for several coils, it is acceptable to position the clutch spring 80 evenly or nearly evenly overlying a portion of each of the stop sleeve 50 and the clamp holder 60. If axial space is limited, however, one of the cylindrical surfaces can be made shorter, and engagement of the clutch spring to the particular element can be made using a tang, as exemplified in FIG. 2. Even in that situation, however, it is still preferable to provide at least a couple of coils over each of the cylindrical surfaces to reduce the amount of force to which the tang is subjected. Additionally, in order to improve control over the sliding rotation of the clutch spring towards the free arm position, it is preferable to provide the stop sleeve with a ring-shaped lip 50c, which extends far enough to cover at least one turn of the clutch spring 80. The ring-shaped lip 50c prevents the coils of the clutch spring from opening excessively before the spring starts to slide relative to the clamp holder 60.

The pivot arm 20 has a cavity 21 formed therein into which the axial tongue 50a of the stop sleeve 50 fits. Although the cavity 21 may have a tight fit with the tongue 50a, it is preferable for the cavity to be slightly larger than the axial tongue 50a so as to permit a slight degree of free rotational movement of the pivot arm 20 relative to the stop sleeve 50. In order to minimize wear on the backstop device 40, it is recommended that this degree of rotational "play" be at least approximately the same as the rotational degree of arm movement caused by thermal expansion of the engine and/or the arm vibration caused by engine dynamics. This angular range will vary from one engine configuration to another and generally is on the order of 20° to 50°. The pivot arm 20 also has a hex hole 23 formed therein, which hex hole 23 is accessible to a corresponding tool such as an Allen wrench (not shown)

or any other convenient lever- or handle-type device which can be inserted into the hex hole 23 through an opening 14a in the thrust washer 14.

Figure 5:
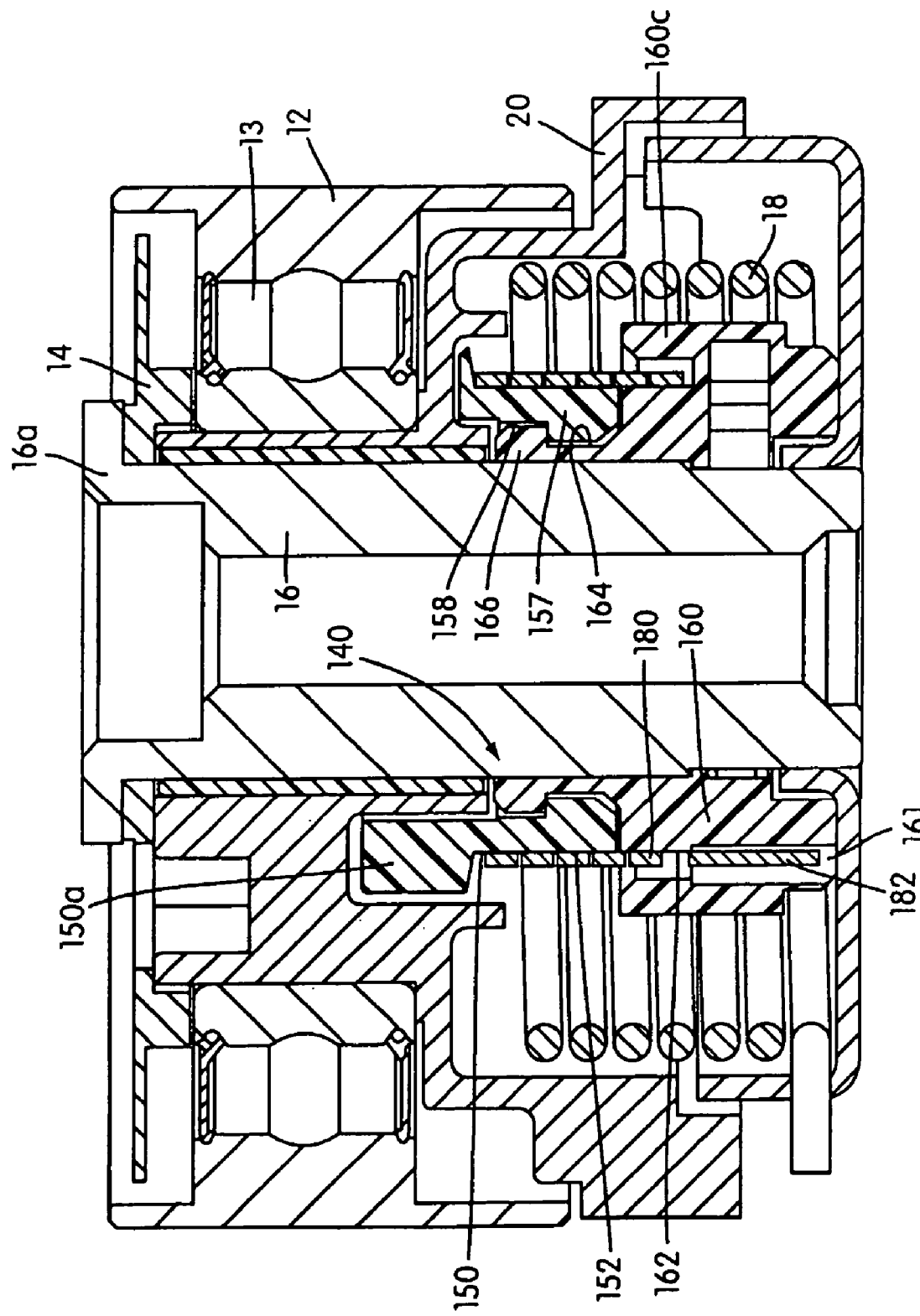
FIG. 5 is a section view of another embodiment of a tensioner according to the invention.
Figure 6:
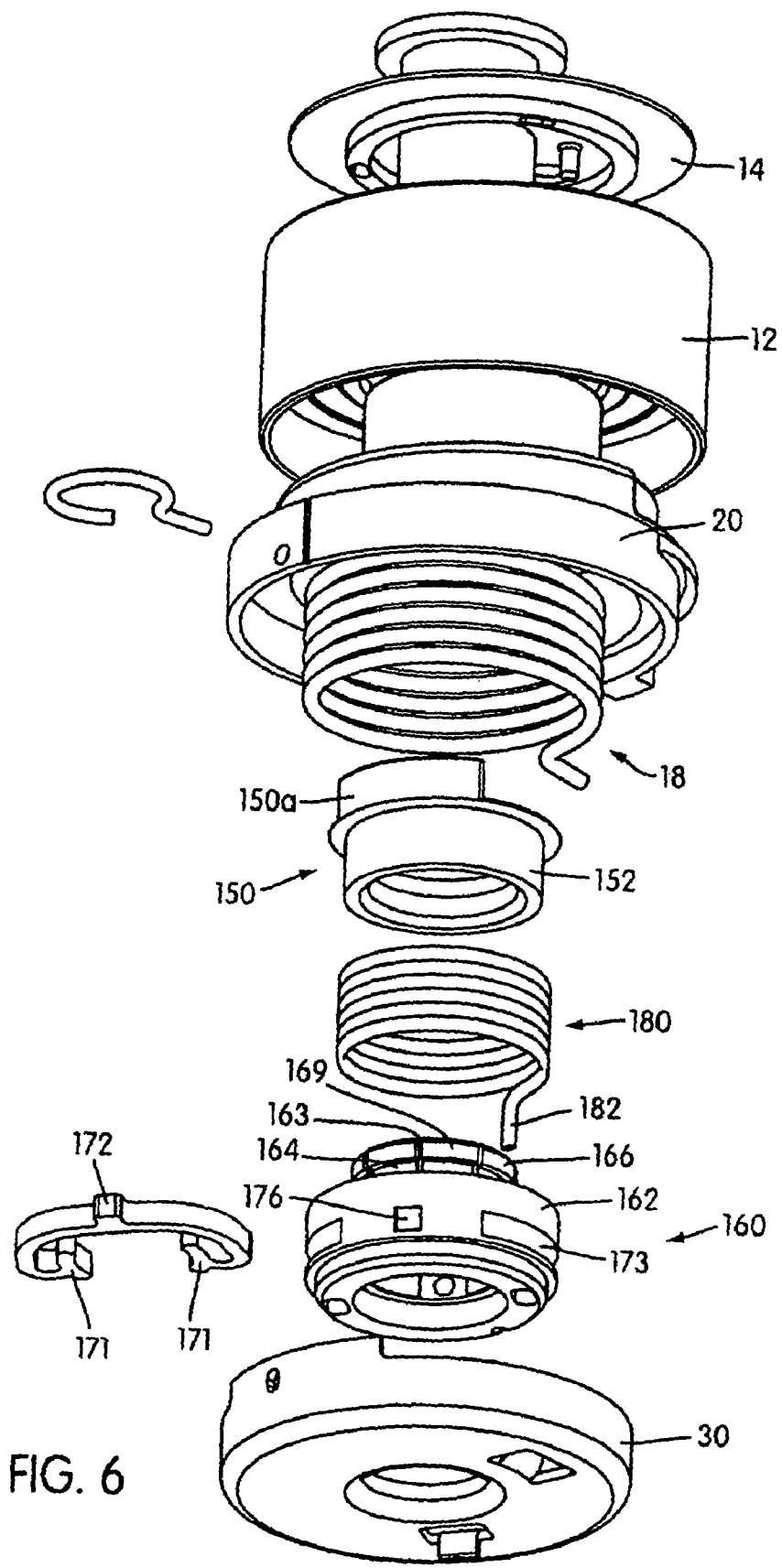
FIG. 6 is an assembly view of the tensioner shown in FIG. 5.

An alternative configuration of a tensioner according to the invention is shown in FIGS. 5 and 6. The configuration is similar to that shown in FIG. 2, but with some variation in the configuration of the backstop device 140 and the provision of an installation clip (not shown), which can consist of any mechanical device that is capable of rotationally locking the pivot arm relative to the stationary components of the tensioner). In particular, in the backstop device 140, certain features of the stop sleeve 150 and the clamp holder 160 are reversed (as compared to the previous embodiment) to permit the axial spring tang 182 at the end of the clutch spring 180 to be secured within hole 161 formed in the clamp holder 160 (rather than in the stop sleeve 50, as shown in FIG. 2). Consequently, because it is preferable for the cylindrical, outer surface 152 of the stop sleeve 150 to be longer than the corresponding cylindrical, outer surface 162 of the clamp holder 160 so as to accommodate the appropriate number of spring coils thereon, it becomes necessary to form the external protrusions 166 and external groove 164 on the clamp holder 160 and the mating or interengaging internal ring 157 and internal groove 158 on the stop sleeve 150. Accordingly, the axial slits 163, which define flexural fingers 169 to facilitate assembly of the components, are formed in the clamp holder 160, as shown in FIG. 6. Similarly, the lip 160c, which restricts excessive opening of the clutch spring 180, is formed in the clamp holder 160. Because side forces acting on the clamp holder 10 occur much more seldom than on the stop sleeve 150, and because the clamp holder 160 needs to rotate relative to the pivot shaft 16 only under high torque conditions, it is possible to forego providing any bushings between the clamp holder 160 and the pivot shaft 16.

Additionally, in this embodiment, the clamp holder 160 and frictional clamp 170 are configured such that the frictional clamp 170 fits within the groove 173, which is formed as a slot extending diametrically all the way across the clamp holder 160, with the pads 171 being exposed to engage the side surfaces of the pivot shaft 16. Tab 172 protrudes outwardly from the frictional clamp 170 (rather than inwardly, as in the embodiment illustrated in FIG. 4) and fits within radial slot 176 extending perpendicularly to the groove 173 so as to properly position and retain the frictional clamp 170 in the groove 173. The frictional clamp 170 is inserted into the clamp holder 160 by pushing the frictional clamp sideways into the groove or slot 173 until the tab 172 is aligned with the slot 176, and the frictional clamp is then moved radially so that the tab 172 engages into the radial slot 176.

The installation clip facilitates installation of the tensioner onto the engine. In particular, the clip is inserted into corresponding holes in the pivot arm 20 and some stationary component or components of the tensioner 10 (e.g., the base plate 30 while the pivot arm 20 is being turned close to or all the way to the outmost backstop position, normally while the tensioner is on the assembly line during manufacture. While the installation clip is inserted, the pivot arm 20 can not rotate away from the initial, factory-set position until the installation clip is removed.

Figure 7:
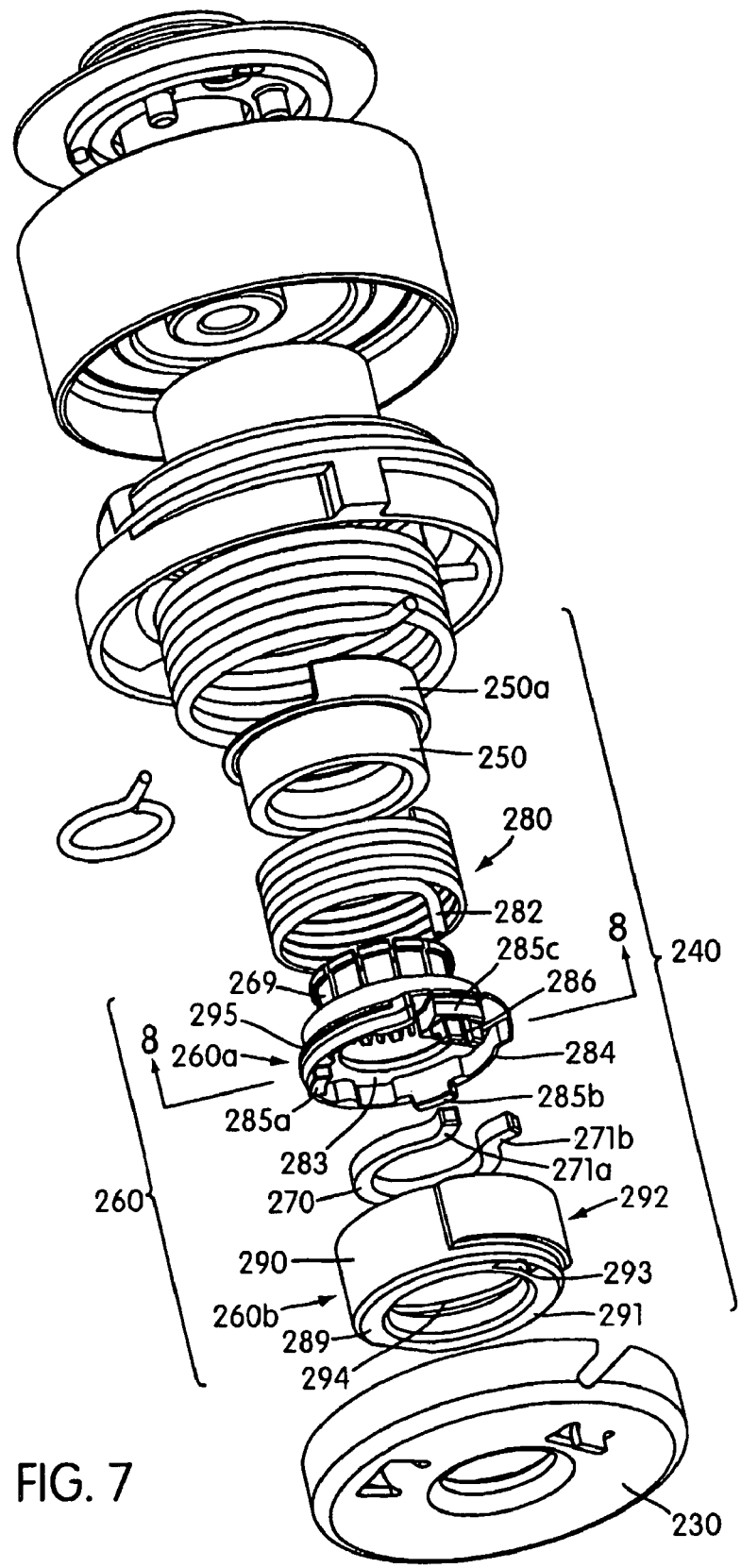
FIG. 7 is an assembly view of another embodiment of a tensioner according to the invention.
Figure 8:
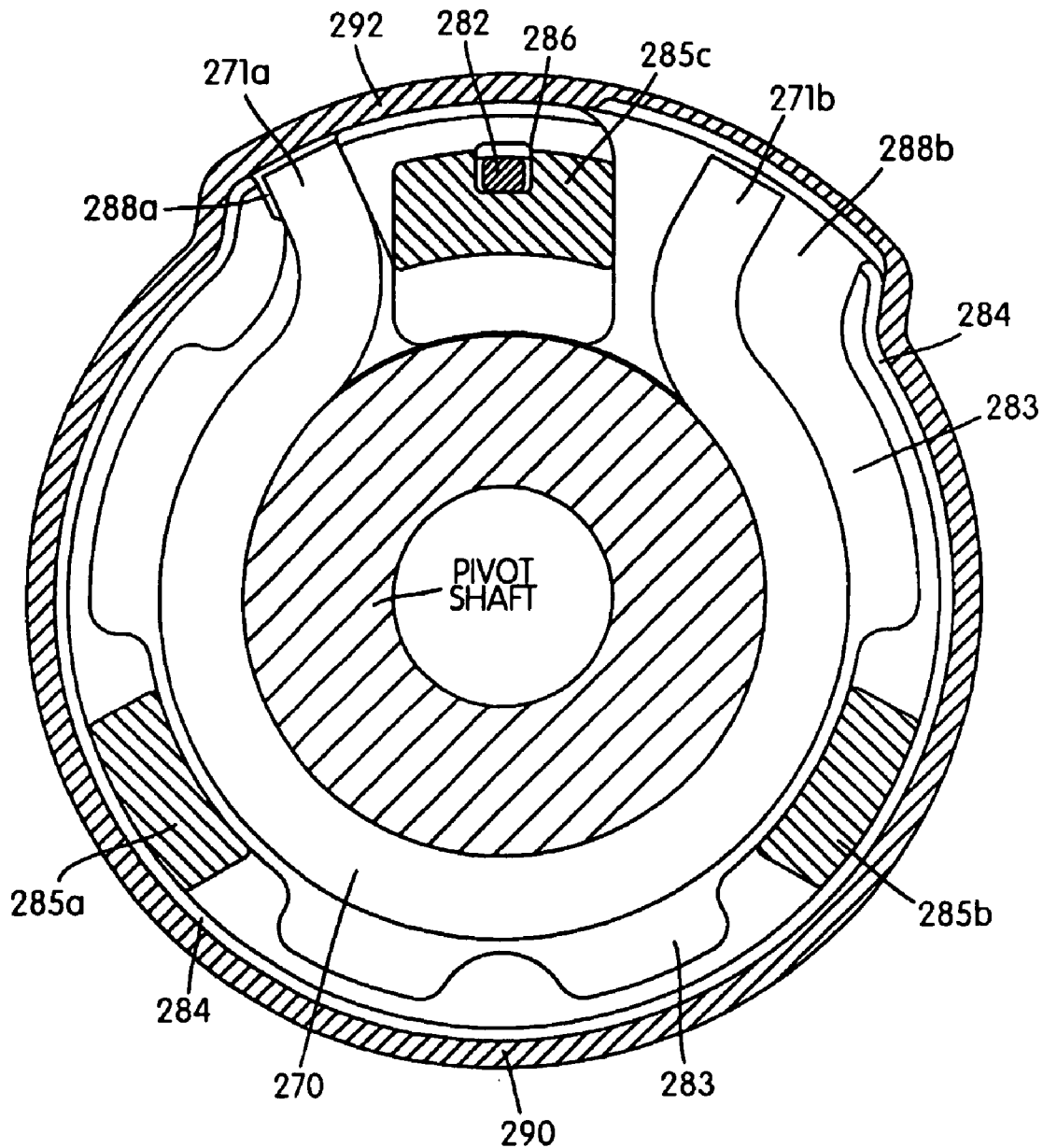
FIG. 8 is a cross-sectional view illustrating the configuration of the upper, clamp sleeve and its assembled relation to the lower, bottom sleeve shown in FIG. 7, the cross-section being taken along a cutting plane passing through the tenons of the upper, clamp sleeve and being shown looking toward the pivot arm along lines 8-8 in FIG. 7.

Yet another configuration of a tensioner according to the invention is shown in FIGS. 7 and 8. The overall configuration is similar to the configuration shown in FIGS. 5 and 6, but the frictional clamp 270 and the clamp holder 260 and configured differently. In particular, the frictional clamp 270 is configured more like a split ring than the frictional clamps 70 and 170 in the above-described embodiments, and the frictional clamp 270 is configured such that it makes frictional contact with the tensioner pivot shaft to a greater circumferential extent than the two previously described embodiments do. For example, the frictional clamp 270 preferably makes contact over approximately 270° around the circumference of the pivot shaft.

Preferably, the frictional clamp 270 is made from stainless steel spring wire. Although the dimensions of the spring wire of the frictional spring clamp 270 will, of course, vary depending on the level of torque against which the frictional clamp is required to hold, for reference purposes, the spring wire from which the frictional clamp 270 is made, as illustrated, has a square cross-section that is 3 mm×3 mm. It has been found that the frictional clamp 270 is generally easier to make, stronger, and provides more consistent torque-resisting performance than the above-described frictional clamps 70 and 170.

Additionally, the clamp 270 performs slightly differently while rotationally sliding than the clamps shown in FIGS. 4 and 6 do. While the tang 271a is being pushed by the upper, clamp sleeve 260a, it will cause the clamp 270 to open slightly, thereby reducing the clamping force and frictional resistance to turning. In other words, the frictional brake can be constructed to open at least partially under those conditions in which the frictional holding is expected to be released. As a result, variation in the coefficient of friction will have a reduced effect on the torque at which release/sliding of the frictional brake occurs.

In order to accommodate the frictional clamp 270, the clamp holder 260 is formed from two components, namely, an upper, clamp sleeve 260a and a lower, bottom sleeve 260b. As more clearly shown in FIG. 8, the frictional clamp 270 fits within the "pocket" that is bounded by shoulder surface 283 and the peripheral wall 284 of the clamp sleeve 260a.

Three posts or tenons 285a, 285b, and 285c are formed extending from the peripheral wall 284, and the associated portion of the peripheral wall 284 is "beefed up" accordingly. The portion of the peripheral wall 284 on which the tenon 285c is formed has a hole (not visible) extending through it, and that hole transitions—at the lower surface of the peripheral wall 284 (as the clamp sleeve 260a is oriented in FIG. 7)—into a slot 286 that is formed in the radially outer surface 287 of the tenon 285c. The hole and the slot 287 are configured to receive all or nearly all of the length of the axially extending lower tang 282 of the clutch spring 280 in a manner suitable to retain the lower tang 282, which rotationally fixes the clutch spring 280 relative to the clamp sleeve 260a (and, accordingly, relative to the clamp holder 260 once it is assembled together).

Two notches or grooves 288a and 288b are also formed in the peripheral wall 284 of the clamp sleeve 260a, with one on either side of the tenon 285c that is configured to receive the axial tang 282 of the clutch spring 280. As best shown in FIG. 8, the notches or grooves 288a and 288b receive the tang-like end portions of the frictional clamp 270. One of the notches 288a is relatively narrow so as to receive the corresponding end 271a of the frictional clamp 270 with a snug fit, which holds the end 271a of the frictional clamp 270 securely in place, whereas the other notch 288b is relatively wider so as to accommodate assembly variances.

It would be desirable for the portion of the clamp sleeve 260a that the clutch spring 280 engages to have a relatively high coefficient of friction to facilitate gripping of the clutch spring 280 to the clamp sleeve 260a. On the other hand, it would be desirable for the portion of the clamp sleeve 260a which rotationally engages the stop sleeve 250 to have a relatively low coefficient of friction in order to facilitate relative rotation of the two parts. Additionally, the flexural fingers 269 of the clamp sleeve 260a should be sufficiently resilient that they do not break when the stop sleeve 250 and the clamp sleeve 260a are pressed together. In view of these various considerations, the clamp sleeve 260a might be made by co-molding different materials, each having the desired coefficient of friction and flexibility to achieve these goals, or the clamp sleeve can be made from a material (such as nylon 46) which is selected to meet simultaneously all three of these considerations as well as possible.

The bottom sleeve 260b generally serves three primary purposes. First, it serves to enclose the frictional clamp 270 within the clamp holder 260 in proper position; second, it "ties" the three tenons 285a, 28b, and 285c together so that the combined unit of the frictional clamp 270 and the clamp sleeve 260a can better withstand torsional loads (imparted to the clamp sleeve 260a through the axial tang 282 of the clutch spring 280 and by the wrapping of the clutch spring 280 around the cylindrical outer surface of the clamp sleeve 260a) than would be the case if just the single tenon 285c were receiving such torsional loads; and third, the bottom (as oriented in FIG. 7) surface 289 of the bottom sleeve 260b functions as a thrust bearing which allows the backstop device 240 to rotate relative to the base plate 230 while bearing against the base plate 230 under axial loads that may be generated in the tensioner. To the end of having the bottom surface 289 function as a thrust bearing surface, the bottom sleeve 260b preferably is formed from a material such as unfilled nylon, which has a relatively low coefficient of friction $\mu$.

As further illustrated in FIGS. 7 and 8, the bottom sleeve 260b has a generally cylindrical peripheral wall 290 and a ring-shaped end "wall" 291, the exposed portion of which provides the bottom surface 289 that functions as a thrust bearing surface. The peripheral wall 290 bulges radially outward over a slight portion 292 thereof to provide space into which the tang-like clamp ends 271a and 271b can fit when the clamp holder 260 is assembled. Furthermore, a slot 293 extends axially through the ring-shaped end wall 291, and the tenon 285c (with the axial tang 282 of the clutch spring 280 positioned in the slot 286 of the tenon 285c) extends into the slot 293 (but not beyond the bearing surface 289) when the clamp holder 260 (and the remainder of the tensioner components) is assembled. Two more slots (not visible) are formed as blind holes in the upper surface of the ring-shaped end wall 291 and are positioned to receive the other two tenons 285a and 285b when the components of the clamp holder 260 are assembled together.

The peripheral wall 290 of the bottom sleeve 260b has a bead 294 extending circumferentially around the inner surface of the peripheral wall 290, near the upper edge of the peripheral wall 290 (in the illustrated orientation). The bead 294 engages a narrow, circumferentially extending locking groove 295 which is formed around the peripheral wall 284 of the clamp sleeve 260a. Thus, once the frictional clamp 270 is properly positioned in the "pocket" of the clamp sleeve 260a, the clamp holder 260 is assembled by pressing the clamp sleeve 260a and the bottom sleeve 260b together until the bead 294 snaps into the locking groove 295, with the tenons 285a, 285b, and 285c seating in their respective slots in the ring-shaped end wall 291 of the bottom sleeve 260b.

The bottom sleeve 260b also has an upper, ring-shaped lip (not visible) around the upper (as oriented in FIG. 7) edge of the peripheral wall 290, which lip is similar in construction to the lip 50c shown in FIG. 2 or the lip 160c shown in FIG. 5. The ring-shaped lip is sized to accommodate the lower coil or coils of the clutch spring 280 when the tensioner is assembled and thus prevents the coils of the clutch spring 280 from opening excessively before the spring starts to slide relative to the clamp holder 260.

The tensioner (and, in particular, the backstop device 40, 140, or 240) operates as follows. During initial installation of the tensioner and the belt, the tensioner is normally mounted to its proper location on the engine using a bolt (not shown) extending through the bore 16b of the pivot shaft 16 and threaded into the engine. If the tensioner has an installation clip 11, the arm 20 will already be in the minimum take-up position to facilitate mounting of the belt. Otherwise, if the tensioner does not have an installation clip (especially during re-installation of the tensioner during field service, when the clip may no longer be available), the person installing the tensioner must move the pivot arm 20 into or close to the minimum belt take-up position in order to install a belt over the tensioner pulley 12. This can be done by inserting an Allen wrench into the hex hole 23 in the pivot arm 20 and rotating the pivot arm 20 towards the minimum belt take-up position. If there is some rotational "play" between the pivot arm 20 and the stop sleeve 50, 150, or 250 due to rotational clearance between the axial tongue 50a, 150a, or 250a and the cavity 21 formed in the pivot arm 20, the only initial resistance to rotation the installer will feel is that provided by the main spring 18. Once any "play" has been taken up, the installer must also rotate the stop sleeve 50, 150, or 250. Because the stop sleeve 50, 150, or 250 is partially rotationally fixed to the pivot shaft 16 via the frictional clamp 70, 170, or 270, the installer must also overcome the rotational resistance created by the friction between the clamp 70, 170, or 270 and the pivot shaft 16. This frictional resistance is designed to be high enough to resist the belt force-induced torque caused by reverse rotation of the engine but low enough to allow the installer to rotate the pivot arm 20 backwards. Therefore, the installer will be able to move the pivot arm 20 all the way to the minimum belt take-up position, at which point the belt is installed over the various sprockets and pulleys.

After the belt is positioned over the various pulleys, the pivot arm 20 (and hence the pulley 12) must be allowed to pivot freely towards the belt to provide proper belt tension. If the tensioner has an installation clip 11, the installer simply removes the clip 11. If the arm and pulley assembly was manually rotated to the minimum take-up position, the installer releases pressure on the tool (Allen wrench) and lets the main spring 18 cause the pivot arm 20 (and the pulley 12) to rotate toward the belt. Once the pulley 12 is resting firmly against the belt, the tool can be removed to complete the manual installation process. In either case, the main spring 18 can provide the necessary arm movement toward the belt (and consequent belt tension) because the backstop device does not create any significant resistance to rotation of the pivot arm 20 toward the free arm position.

Ordinarily, the tensioner occasionally will be subjected to certain running conditions of the engine which will increase belt loading on the pulley and hence apply torque to the pivot arm 20 in the reverse direction, i.e., the direction away from the belt. Two of such running conditions are cold starts following normal thermal expansion of the engine and backwards rotation of the engine. In each of these instances, if there is any rotational "play," the pivot arm 20 will rotate backwards toward the backstop until the relevant end surface of the cavity 21 in the pivot arm 20 contacts the axially extending tongue 50a, 150a, or 250a of the stop sleeve 50, 150, or 250; otherwise (i.e., when there is a tight fit between the axially extending tongue and the cavity), the pivot arm will not rotate relative to the stop sleeve. Subsequently, backward rotation of the pivot arm 20 (i.e., rotation away from the belt) will be prevented because the pivot arm will be linked to the frictional clamp via the stop sleeve, spring clutch, and clamp holder, and the frictional clamp provides enough friction to resist such backward rotation to prevent tooth skip while allowing for manually forced rotation of the frictional brake and, consequently, the tensioner arm to permit easy installation or reinstallation.

In the embodiments described above, a spring clutch provides the necessary one-way function. However, any known one-way device (e.g., one-way roller clutches, ratchet-and-pawl, etc.) could be used to interconnect the stop sleeve to the frictional brake. Similarly, rather than a clamp, the frictional brake could be of any known construction which creates a braking force by means of friction.

Figure 9:
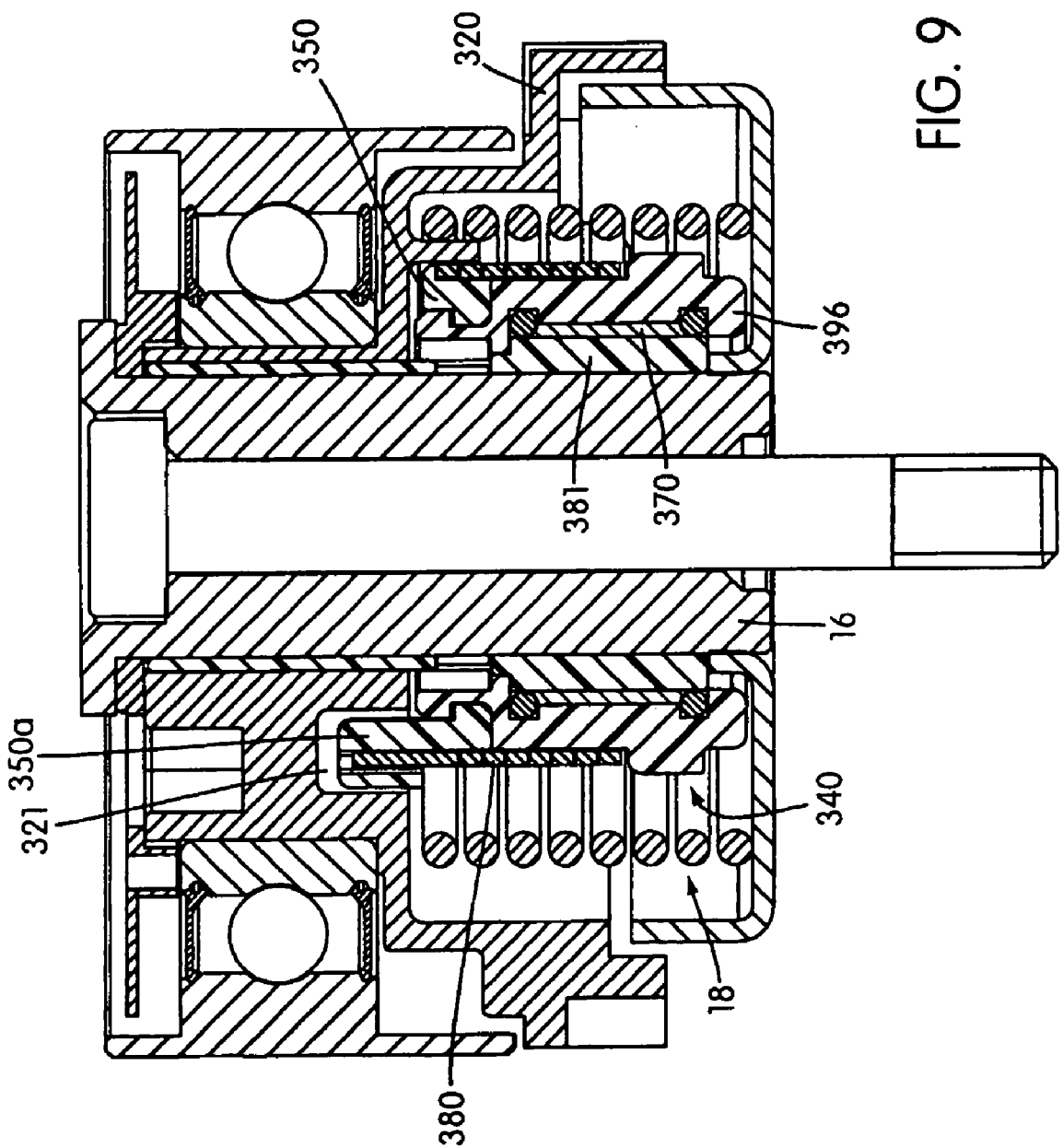
FIG. 9 is a section view of another embodiment of a tensioner according to the invention.

Alternatively, as illustrated in FIG. 9 and instead of a frictional brake, the tensioner could be constructed using a hydraulic device designed to create enough resistance and have enough holding power to prevent reverse movement of the backstop and consequent rotation of the arm away from the belt (which rotation of the arm can allow tooth-skip to occur). Such hydraulic device could any previously known hydraulic device or, for example, a viscous coupling assembly like that disclosed in co-pending application Ser. No. 09/547,108 (filed on Apr. 11, 2000, the disclosure of which is incorporated by reference) while still obtaining the benefit of various features of the invention. With such a coupling assembly 340, viscous material 370 is provided between one member 381, which is fixed to the outer surface of a bottom portion of the pivot shaft 16, and a second member 396, which can rotate relative to the first member 381. (The second member 396 is shown as being of unitary construction for illustration purposes but may be of two-part, upper- and lower-half construction as illustrated in the above-referenced application Ser. No. 09/547,108.) When torsional loads are applied suddenly to the pivot arm 320 and transmitted to the second member 396 via stop sleeve 350 and clutch spring 380, the viscous material 370 prevents the second member 396 from rotating relative to the first member 381 (due to its viscosity), but when torsional loads are applied gradually and/or continuously, the viscous material 370 permits the second member 396 to rotate relative to the first member 381.

Stop sleeve 350, which is somewhat shorter than the ones described above, is connected to the second member 396 in a similar manner as that described above. In particular, the interconnection between the two components axially locks them together but permits one component to rotate relative to the other. Clutch spring 380 clutches the stop sleeve 350 to the second member 396 in generally the same manner as it clutches the stop sleeve to the clamp holder in the various embodiments described above.

By providing rotational "play" between the pivot arm 320 and the stop sleeve 350, as described above (e.g., by making the cavity 321 into which the axial tongue 350*a* of the stop sleeve 350 fits larger than the axial tongue 350*a*), the amount of vibration the hydraulic device must endure is reduced. This prolongs the service life of the hydraulic device.

Figure 10:
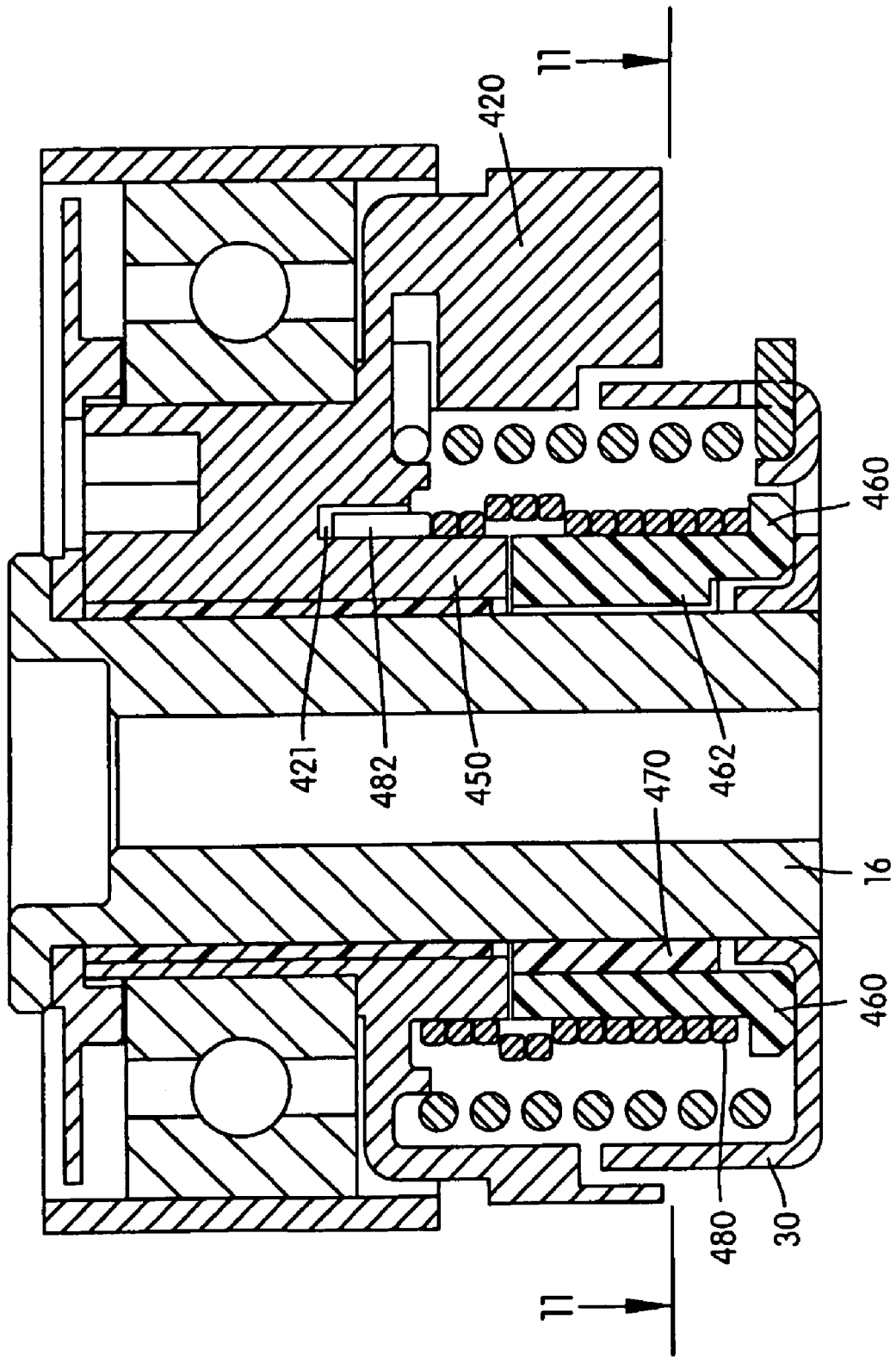
FIG. 10 is a section view of yet another embodiment of a tensioner according to the invention.
Figure 11:
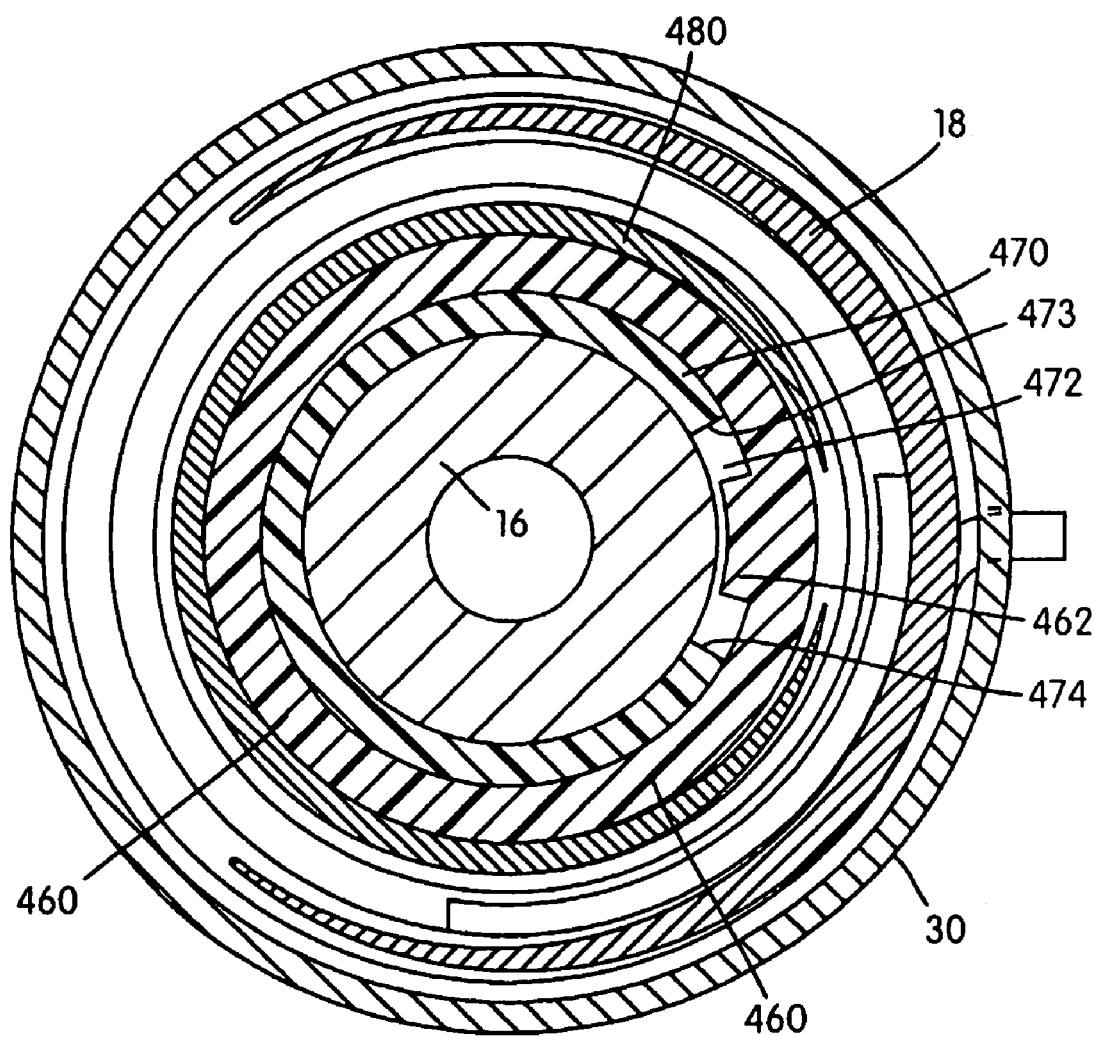
FIG. 11 is a cross-sectional view of the tensioner shown in FIG. 10, taken along lines 11-11.

A still further embodiment of a tensioner according to the invention is illustrated in FIGS. 10 and 11. In this embodiment, the "stop sleeve" 450 is formed as an integral part or extension of the tensioner pivot arm 420. In this embodiment, the clutch spring 480 is effectively connected directly to the tensioner pivot arm 420, with the axial tang 482 of the clutch spring 480 extending into cavity 421 formed in the tensioner pivot arm 420. (In an alternative configuration, the opposite, bottom end of the clutch spring 480 may be affixed in appropriate fashion to the "clamp sleeve" 460.)

As illustrated more clearly in FIG. 11, the frictional brake 470 is formed as a cylinder surrounding a lower portion of the pivot shaft 16, with a sector 472 of the cylinder being removed. The "clamp sleeve" 460 is coaxial with and fits over the external surface of the friction brake 470. The clamp sleeve 460 has a key 462 which extends radially inward from the internal surface of the clamp sleeve 460, and the key 462 fits within the removed sector 472 of the frictional brake 470. Thus, the frictional brake 470 is forced to rotate around the pivot shaft when the clamp sleeve 460 has rotated by a sufficient amount to contact the walls 473, 474 of the cut-out sector 472 and applies sufficient force.

It will be understood, of course, that the clamp sleeve 460 is caused to rotate relative to the tensioner pivot shaft 16 by the pivot arm 420 transmitting torque to it through the clutch spring 480. If the number of coils wrapped around the "stop sleeve" 450 (which is essentially an extended core of the tensioner arm 420) is high enough, and/or if the clutch spring has the axial tang 482 positioned securely within the cavity 421 as illustrated, the clutch spring 480 will continuously follow movement of the tensioner pivot arm 420.

It is preferred, however, for the tensioner to have a slight amount of "free stroke" to allow the tensioner arm 420 to rotate freely by a certain amount (corresponding to thermal expansion of the engine and/or dynamic oscillation of the belt drive). Such free stroke can be effected by either or both of two alternative features, both of which are illustrated. First, by making the key 462 of the clamp sleeve 460 narrower than the cut out sector 472, the pivot arm 420 will be provided with a certain amount of rotational play. Additionally or alternatively, by forming the clutch spring 480 with a couple of larger diameter turns, as shown, a certain amount of rotational play will be built into the assembly. This is because once the pivot arm 420 starts to rotate the clutch spring 480, the larger diameter turns of the clutch spring 480 must constrict into contact with the underlying surfaces before the clutch spring can create any major turning torque towards the clamp sleeve 460. As yet another alternative (not illustrated), rotational play can be provided by reducing (or even totally eliminating) the number of clutch spring coils on the "stop sleeve" 450 (arm core) and forming the cavity 421 as a circumferential arc so that the tensioner arm 420 can rotate a certain amount before the arm forces the clutch spring to follow the arm rotation.

Although in the embodiments of the invention described above and illustrated herein the backstop device resists rotation by the backstop device making frictional engagement with the pivot shaft 16, the tensioner may also be configured such that the backstop device resists rotation by frictional engagement with a fixed portion other than the pivot shaft 16, such as the base plate 30 or even the engine itself (e.g., if no base plate is provided). These and other embodiments are deemed to be within the scope of the following claims.

What is claimed is:

1. A belt tensioner for a motor vehicle engine, comprising:
   a pivot shaft configured to be mounted stationary relative to the motor vehicle engine;
   a pivot arm pivotally mounted on said pivot shaft;
   a pulley rotationally supported on said pivot arm;
   a spring that biases said pivot arm in a belt take-up direction; and
   a backstop device operably engaging said pivot arm to provide a predetermined, limited amount of rotational play therebetween and to prevent rotational movement of said pivot arm from a minimum belt take-up position in a direction opposite said belt take-up direction, said backstop device comprising a one-way clutch member and a frictional brake member, said frictional brake member being a frictional clamp member relatively fixed to said pivot shaft by means of frictional engagement therewith, said frictional engagement being overcome manually during installation to rotationally position said backstop device to engage the pivot arm when in the minimum belt take-up position, said one-way clutch member including a pair of axially aligned rotational members disposed around said pivot shaft, one of said rotational members engaging said pivot arm and the other of said rotational members is a clamp holder which engages said frictional clamp member, at least one of said rotational members having a cylindrical surface, wherein said one-way clutch member further includes a clutch spring, one end of said clutch spring overlapping said cylindrical section of said at least one of said rotational members and the opposite end of said clutch spring being attached to the other of said rotational members, said clutch spring thereby permitting said rotational members to rotate in one direction relative to each other to permit said pivot arm to pivot substantially freely in said belt take-up direction but substantially preventing said rotational members from rotating in an opposite direction relative to each other to resist pivoting of said pivot arm in said direction opposite to said belt take-up direction.

2. The tensioner of claim 1, wherein the level of said frictional engagement between said frictional brake member and said pivot shaft is large enough to stop pivoting of said pivot arm in said direction opposite to said belt take-up direction when said pivot arm is subjected to belt load-induced torque under normal engine operating conditions and small enough to allow said pivot arm to be pivoted manually during installation in said direction opposite to said belt take-up direction.

3. The tensioner of claim 2, wherein said frictional brake member is constructed to open at least partially when said pivot arm is pivoted manually during installation in said direction opposite to said belt take-up direction.

4. The tensioner of claim 1, wherein said play is approximately the same as a rotational degree of pivot arm movement that is attributable to thermal expansion of the engine.

5. The tensioner of claim 1, wherein said play is approximately the same as the combination of a rotational degree of pivot arm movement that is attributable to thermal expansion of the engine and a rotational degree of pivot arm movement that is attributable to dynamic, engine-induced vibration of said pivot arm.

6. The tensioner of claim 1, wherein said clutch spring has a tang by means of which said clutch spring is anchored to said rotational member which engages said pivot arm.

7. The tensioner of claim 1, wherein said pair of rotational members are axially interconnected directly with each other.

8. A belt tensioner for a motor vehicle engine, comprising:
a pivot shaft configured to be mounted stationary relative to the motor vehicle engine;
a pivot arm pivotally mounted on said pivot shaft;
a pulley rotationally supported on said pivot arm;
a spring that biases said pivot arm in a belt take-up direction; and
a backstop device installed about the pivot shaft and operably engaging said pivot arm providing a predetermined, limited amount of rotational play between said pivot arm and said backstop device and preventing rotational movement of said pivot arm from a minimum belt take-up position in a direction opposite said belt take-up direction, said backstop device including a frictional clamp member and a one-way clutch member including a pair of axially aligned, generally cylindrical members disposed around said pivot shaft, one of said generally cylindrical members having an arm-engaging portion engaging said pivot arm and the other of said generally cylindrical members is a clamp holder which supports said frictional clamp member, and wherein said one-way clutch member includes a clutch spring which overlaps said pair of generally cylindrical members and permits said generally cylindrical members to rotate in one direction relative to each other permitting said pivot arm to pivot substantially freely in said belt take-up direction, but substantially prevents said generally cylindrical members from rotating in an opposite direction relative to each other resisting said pivot arm from pivoting in a direction opposite to said belt take-up direction by engagement of said pivot arm by said arm-engaging portion, frictional engagement of said frictional clamp member with said pivot shaft, and interlocking action of said one-way clutch member between said frictional clamp member and said arm-engaging portion.

9. The tensioner of claim 8, wherein the level of said frictional engagement between said frictional clamp member and said pivot shaft is large enough to resist pivoting of said pivot arm in said direction opposite to said belt take-up direction when said pivot arm is subjected to belt load-induced torque under normal engine operating conditions and small enough to allow said pivot arm to be pivoted manually during installation in said direction opposite to said belt take-up direction.

10. The tensioner of claim 8, wherein said clamp holder comprises an upper, clamp sleeve member and a lower, bottom sleeve member and wherein said frictional clamp member is housed between said upper, clamp sleeve member and said lower, bottom sleeve member.

11. The tensioner of claim 8, wherein said clutch spring is connected to said generally cylindrical member which engages said pivot arm.

12. The tensioner of claim 8, wherein said pair of generally cylindrical members are axially interconnected directly with each other.

13. The tensioner of claim 8, wherein an amount of play is provided between said pivot arm and an engagement portion of said generally cylindrical member engaging said pivot arm.

* * * * *